United States Patent Office 3,560,381
Patented Feb. 2, 1971

3,560,381
HIGH DENSITY BORON PRODUCT COMPRISING A MECHANICAL MIXTURE OF BORIC OXIDE WITH ANHYDROUS BORAX OR SODIUM TETRABORATE PENTAHYDRATE
Frank T. Winters, Jr., La Crescenta, John C. Middleton, Yorba Linda, and Lawrence L. Schwalley, Whittier, Calif., assignors to United States Borax & Chemical Corporation, Los Angeles, Calif., a corporation of Nevada
No Drawing. Filed Apr. 30, 1968, Ser. No. 725,482
Int. Cl. A01n 9/02; C09k 3/28
U.S. Cl. 252—8.1
10 Claims

ABSTRACT OF THE DISCLOSURE

A high density, water soluble boron product formed from a mechanical mixture of boric oxide with either anhydrous borax or sodium tetraborate pentahydrate (borax 5 mol). The product has a $Na_2O/B_2O_3$ molar ratio of from .16 to .32 and a loose density of greater than 50 pounds/cu. ft.

BACKGROUND OF INVENTION

Boron compositions are used extensively in concentrated solutions as fire retardants when applied to wood products or as total herbicides and soil sterilants when applied to foliage. Dilute boron compositions are also utilized to provide small amounts of boron in fertilizers. The utilization and stabilization of boron solutions are discussed more thoroughly in Patents Nos. 2,643,947 and 2,662,810.

Boron has normally been provided in the form of water soluble sodium borate compositions such as described in Patent No. 2,998,310. These compositions are formed by spray drying or dehydrating aqueous solutions of at least two boron compounds such as boric acid, meta-boric acid, sodium metaborate, sodium tetraborate and sodium pentaborate. The product produced by such processes is typically substantially all smaller than 200 mesh but fluffy in nature and of a relatively low density. For example, the bulk densities of these products range from between 17 to 24 pounds per cubic foot.

It has been known that mechanical mixtures of particulate boron compounds prepared from granular sodium tetraborate and granular sodium pentaborate or boric acid, are denser than the spray dried compositions. This is beneficial since it enables greater quantities of the product to be stored in the available warehouse space. These mixtures have lower solubility rates and are more inclined to caking, however. Additionally, mechanical mixtures of these constituents have been known to exhibit some segregation of constituents upon storage and use. The poor solubility rates and tendency to cake and segregate upon storage have discouraged the use of mechanical mixtures of boron compounds for prepackaged water soluble boron products.

A more desirable boron product than those available would be one that is capable of combining the high density of the granular mixtures with the high solubility and resistance to caking and segregation of the spray dried boron containing compositions. Such a product must also have a sufficient boron content to provide effective herbicidal and fire retardant properties per unit upon solution.

SUMMARY OF INVENTION

This invention is directed to a dense, highly water soluble borate product which has been found to be noncaking and resistant to segregation. The product comprises particulated boric oxide (anhydrous boric acid or ABA) intermixed with a borax compound selected from the group consisting of anhydrous borax (AB) and sodium tetraborate pentahydrate (borax 5 mol). The boric oxide and borax compound are present in the product in sufficient amounts to provide a molar ratio of $Na_2O/B_2O_3$ of less than 0.32. The product has a bulk density of greater than 50 pounds per cubic foot or at least two times greater than the density of the spray dried boron containing compositions such as defined in Patent No. 2,998,310.

Thus, one feature of the product of this invention is that it is of high density so that requirements for storage volumes are significantly lower than prior boron compounds for the same product effectiveness.

Another feature of the product of this invention is that the solubility rate in water is high and the tendency for the product to cake and segregate is low.

Another feature of the product of this invention is that no excessive pretreatment is required prior to the mechanical mixing of the boric oxide and anhydrous borax or sodium tetraborate pentahydrate for providing the advantageous properties of high density, high solubility rate and resistance to caking and constituent segregation.

These and other features of this invention will become more apparent from a consideration of the appended claims when taken in conjunction with the following description of the preferred embodiments and examples.

DESCRIPTION AND PREFERRED EMBODIMENTS

The solubility rates of the mixtures of boric oxide and anhydrous borax or sodium tetraborate pentahydrate surprisingly have been found to be higher than the spray dried and dehydrated boron compositions. These solubility rates have also been found to be enhanced by making the particle size of the borax compound different than that of the boric oxide. For example, if the borax compound has a coarse particle size, the boric oxide particle size should be fine and vice-versa.

Even more surprisingly, it has been found that the prepackaged products of this invention are extremely resistant to caking and segregation after storage for extended periods of time. In particular data collected using a mixture of boric oxide and sodium tetraborate pentahydrate has been very favorable with respect to these properties.

Best solubility rates have been observed when the molar ratio of $Na_2O/B_2O_3$ in the mixture was less than .32. It appears that this molar ratio affected the caking of the product as well as its solubility rate. When the ratio of $Na_2O/B_2O_3$ in the mixture exceeded .32 the solubility time generally increased above tolerable levels.

Best results have been observed when the lower limit of the $Na_2O/B_2O_3$ molar ratio was about .16. The mixture is not completely soluble under commercial use conditions if the ratio is below this limit presumably due to the high $Na_2O$ content.

Thus for the mechanical mixtures of boric oxide with either anhydrous borax or sodium tetraborate pentahydrate the $Na_2O/B_2O_3$ ratio should be less than .32 and preferably between .16 and .32. Within these ranges it has been found that the solubility rate of the product surprisingly is higher than the solubility rate of the spray dried and pretreated sodium borate compositions. The optimum $Na_2O/B_2O_3$ molar ratio for best solubility is from 0.23 to 0.26. Various proportions of the mixture constituents can be used to obtain these molar ratios depending upon the water of hydration and impurities present in the granular compounds.

The enhanced solubility of the product of this invention is particularly dramatic when compared with the solubility rate of the borate composition defined in Pat. No. 2,998,310. It has been found, as shown in Table IV, that the product of this invention has a solubility rate much higher than the amorphous sodium borate composition of that patent.

Additionally, it has been found that the product of this invention can be dissolved rapidly in water even in a relatively quiescent vessel. For example, the product was allowed to stand without agitation on the bottom of a dissolving vessel for 30 minutes at 140° to 148° F. and no caking of the product was observed. With slight agitation of the solution, the product dispersed easily and total dissolution was accomplished in a short time.

The boric oxide and borax 5 mol product of this invention is also highly resistant to caking when prepackaged in bulk quantities. For example, several 80 pound bags of a boric oxide and borax 5 mol mixture having a molar ratio between 0.23 and 0.26 were stored on pallets after the mixture had been prepared. After a period of about 120 days, the pallets and bags were shifted and several bags from the bottom and top of the stacks were opened for inspection. None of the inspected product was found to show any signs of caking. In the laboratory, only indications of slight tendencies toward caking were observed for a small number of samples throughout the broader $Na_2O/B_2O_3$ molar ratio range of 0.16 to 0.32. No actual caking was observed, however. No tendency toward caking was observed for the boric oxide and anhydrous borax product in either bulk or laboratory tests throughout the broad $Na_2O/B_2O_3$ molar ratio range of 0.16 to 0.32.

The preferred product comprises a mixture of boric oxide and sodium tetraborate pentahydrate in amounts sufficient to provide a molar ratio of $Na_2O/B_2O_3$ of from about 0.23 to 0.26 and a bulk density of at least about 60 pounds per cubic foot in the loose mixture.

Best results have been obtained when the proportion of boric oxide to sodium tetraborate pentahydrate varies from about 20% to 80% by weight boric oxide. Within these ranges, the boron content of the mixture is preferably maintained above 20% by weight. For this level of boron, the mixture is usable both as a herbicide and fire retardant agent and can be conveniently diluted by the user for the selected purpose.

The optimum $Na_2O/B_2O_3$ molar ratio for the boric oxide and anhydrous borax product is from 0.23 to 0.26 also and these ratios can be obtained using varying quantities of the mixture constituents depending upon their purities. Generally the boric oxide may comprise from 20 to 80% by weight of the mixture.

Slight tendencies toward caking have been observed in the laboratory when the boric oxide and borax pentahydrate particles are substantially of the same size. Therefore, with these constituents, the preferred mixture is formed from coarse grains of one of the materials and fine grains of the other. The boric oxide coarse particles have 98% by weight of the particles larger than 40 mesh. The boric oxide fines are 73% by weight smaller than 40 mesh. A coarse sodium tetraborate pentahydrate has a particle distribution of over 77% by weight of a grain size larger than 30 mesh and 90% by weight of the particles larger than 40 mesh. The sodium tetraborate pentahydrate fines are about 80% by weight smaller than 100 mesh. A detailed raw material analysis of the materials used to form the products of this invention is shown in Table I. In general, the preferred particle size is from 40 to 200 mesh. Particles smaller than 200 mesh, although operable, are too dusty for easy handling. In some cases, the solubility rate may be deterimentally affected by particle sizes over 40 mesh.

TABLE I.—RAW MATERIALS ANALYSIS

| Screen analysis (cumulative) | Boric oxide (coarse) | Boric oxide (fine) | Anhydrous borax (coarse) | Anhydrous borax (fine) | Borax 5 mol (coarse) granular | Borax 5 mol (fine) Type F |
|---|---|---|---|---|---|---|
| U.S.S. mesh: | | | | | | |
| 16 | 67.0 | | | | | |
| 20 | 94.2 | Trace | 8.2 | | 45.2 | |
| 30 | 97.8 | 7.6 | 25.6 | | 77.4 | |
| 40 | 98.6 | 27.6 | 45.8 | | 90.0 | |
| 50 | 99.8 | 48.0 | 61.2 | Trace | 93.6 | 0.3 |
| 70 | 100.0 | 66.0 | 71.6 | 1.4 | 95.6 | 0.4 |
| 100 | | 79.6 | 80.6 | 5.4 | 96.4 | 19.8 |
| 120 | | 83.6 | 85.6 | 8.0 | 97.2 | |
| 140 | | 86.4 | 90.0 | 12.0 | 97.6 | 53.3 |
| 170 | | 89.4 | 94.0 | 18.2 | 97.9 | |
| 200 | | 90.8 | 96.0 | 22.6 | 98.0 | 76.9 |
| 270 | | 94.0 | 98.6 | 34.2 | 98.4 | 86.2 |
| 325 | | 95.0 | 99.6 | 44.2 | 98.6 | |
| Density: | | | | | | |
| Lb./cu. ft.—loose | 66.2 | 64.9 | 74.3 | 43.9 | 68.0 | 53.0 |
| Lb./cu. ft.—tapped | 74.4 | 78.6 | 95.8 | 69.7 | 78.2 | 61.0 |
| Chemical analysis: | | | | | | |
| $Na_2O$ | | 2.2 | 30.4 | 30.2 | 21.6 | 21.6 |
| $B_2O_3$ | 97.5 | 96.8 | 68.8 | 68.0 | 48.7 | 48.6 |
| $H_2O$ | 2.5 | 0.8 | 0.8 | 1.7 | 29.8 | 29.8 |
| $Na_2SO_4$ | | .23 | | | | |

EXAMPLES

A total of four thousand pounds of product of the composition shown in Table II was made in four mixer batches using a 40 cubic foot capacity Marion mixer. Each batch contained 633 pounds of borax pentahydrate and 367 pounds of boric oxide. Each batch was mixed for ten minutes to obtain a thorough mixing of the constituents.

The mixed product was discharged from the mixer into polyethylene lined bags. The weight of each bag was adjusted to 80 pounds using a platform scale. Samples were collected for analyses during the first third, middle third, and last third of the mixer discharge operation for each batch. This type of sampling procedure was followed so that the analytical results might be used to indicate the degree of product segregation.

Individual chemical and physical analyses were performed on the samples collected during the mixer discharge operation for two batches. The individual results, averages and deviation from arithmetic averages are recorded in Table II and show that there was no segregation of the product constituents during the mixing and bagging operations.

TABLE II.—COMPOSITION AND ANALYSIS OF SAMPLES.[a]

|  | Mixer batch No. 1 | Mixer batch No. 3 | Average values [b] |
|---|---|---|---|
| Weight percent $Na_2O$ in mixer: | | | |
|   Sample A | 13.98 | 14.68 | |
|   Sample B | 14.19 | 14.35 | |
|   Sample C | 14.29 | 14.47 | |
| Average weight percent $Na_2O$ in batch sample | 14.15 | 14.50 | 14.3±0.4 |
| Weight percent $B_2O_3$ in mixer: | | | |
|   Sample A | 65.71 | 65.08 | |
|   Sample B | 65.83 | 65.59 | |
|   Sample C | 65.72 | 65.45 | |
| Average weight percent $B_2O_3$ in batch sample | 65.75 | 65.38 | 65.6±0.3 |
| $Na_2O/B_2O_3$ mole ratio | 0.24 | 0.25 | 0.25±0.01 |
| Bulk density (lb./cu. ft.) | 65.1 | 64.9 | 65.0±4 |
| pH of 1% solution—25° C | 8.5 | 8.5 | 8.5±0.05 |
| Weight percent boron content | | | 20.4±0.1 |
| Particle size distribution cumulative; Weight percent retained on— | | | |
|   U.S. No. 20 | 2.4 | 6.0 | 4.2±1.8 |
|   U.S. No. 30 | 14.0 | 24.4 | 19.2±5.2 |
|   U.S. No. 40 | 40.0 | 57.6 | 48.8±8.8 |
|   U.S. No. 50 | 56.0 | 73.4 | 64.7±8.7 |
|   U.S. No. 70 | 69.6 | 83.6 | 76.6±7.0 |
|   U.S. No. 100 | 80.2 | 90.3 | 85.3±5.1 |
|   U.S. No. 200 | 91.4 | 95.9 | 93.7±2.3 |
|   U.S. No. 325 | 95.8 | 97.4 | 96.6±0.8 |

[a] Three samples were taken from each mixer batch at the time of discharge. Sample "A" represents first material out of mixer. Sample "B" taken at middle of discharge. Sample "C" taken near last of mixer discharge. Samples prepared by mixing 36.7% by weight boric oxide with 63.3% by weight borax pentahydrate.
[b] Plus and minus values are deviation from arithmetic means.

After storage of several bags for a period of 120 days in stacks on pallets, bags from the top and bottom of the stack were opened. No caking or product segregation was observed.

Mixer batch No. 1 taken from Table II was selected as a typical analyses of the product of this invention and the dissolving time in minutes was determined for various temperatures with various ratios of water to the mixture using a Pyrex wide-mouth, tall form bottle, 6 ounce capacity having a 2¾ diameter base and a 6⅞ inch height as the dissolver. A 2,000 ml. Pyrex beaker was used for the water jacket and a coated magnetic stirring rod 1½ inch length was used. The solution was heated with a hot plate magnetic stirrer and two 76 mm. immersion thermometers, having a range of —4° to 230° F. were used. One of the thermometers was used to observe the temperature of the bath and one for the temperature of the water jacket.

The water for the bath and dissolving reactor was preheated and a sample of the mixture of batch No. 1 was weighed out. The quantities of water used in the dissolver and the quantities of the mixture are shown in Table III. The speed of the magnetic stirrer was adjusted to bring the vortex in plain water to the stirring bar on the bottom. This was done for each dissolving test.

The mixture of sample was placed in a feed funnel in which a stopper had been inserted in the bottom. The stopper was removed and the material added at a controlled rate to the water. This step was completed in all tests in a period of 5 to 10 seconds.

The time required for the particles to disappear and the solution to become clear was taken as the dissolving time. The initial temperature, maximum temperature and dissolving time for each test are recorded in Table III.

TABLE III.—SOLUBILITY DATA FOR PRODUCT IN WATER

| Batch No. 1 solution, weight percent | Grams, Batch No. 1 | Grams, water | Temperature (° F.) during dissolving | | | Weight percent $B_2O_3$ found in solution | Dissolving time (minutes) |
| | | | T(i) initial | T(m) maximum | T(f) final | | |
|---|---|---|---|---|---|---|---|
| 33.3 | 100 | 200 | 140 | 149 | 148 | | 2.25 [a] |
| 33.3 | 100 | 200 | 140 | 151 | 151 | | 2.25 [a] |
| 36.9 | 117 | 200 | 151 | 154 | 154 | 23.4 | 2.0 [b] |
| 58.9 | 143 | 100 | 162 | 182 | 174 | 38.1 | 10 [c] |
| 58.9 | 143 | 100 | 164 | 184 | 174 | 38.6 | 16 [d] |
| 36.9 [e] | 117 | 200 | 140 | 148 | 148 | | 13 |

[a] Time required for concentration to go from 0 to 33.3% in solution.
[b] Time required for concentration to go from 33.3% to 36.9% in solution.
[c] Time required for concentration to go from 36.9% to 58.9% in solution.
[d] Time required for concentration to go from 0 to 58.9% in solution.
[e] Composition of Pat. No. 2,998,310 (Polybor ®).

As shown in Table III the solubility rate of the product of this invention is much faster than the spray dried borate compositions. For the batch No. 1 mixture to dissolve forming a 36.9% by weight aqueous solution, only 4.25 minutes total was required. By way of comparison, the spray dried composition took 13 minutes to form a solution of the same weight percent dissolved solids.

Various product mixtures were formed from boric oxide with sodium tetraborate pentahydrate and anhydrous borax by varying the $Na_2O/B_2O_3$ molar ratio. The properties for these product mixtures are shown in Table IV.

The solubility rates for the first 19 products tested in Table IV were determined using a constant temperature bath held at 67° C. 200 grams of tap distilled water was placed in a tall beaker immersed in the bath. The mixing speed was held constant. When the water in the beaker reached 149°–150° F. 100 grams of the desired blended product was introduced over a period of 6 to 10 seconds and the timer was started. When complete solution was effected (as determined by visual inspection) time and temperature were recorded. A 5 ml. volumetric pipette was used to sample the hot solution and titrimetric analysis run on the sample to determine the $Na_2O/B_2O_3$ molar ratios.

The dissolving time of the products as shown is dependent upon the $Na_2O/B_2O_3$ molar ratio. Generally, the solubility rates appear to be favorable for $Na_2O/B_2O_3$ molar ratios from about 0.16 to about 0.32. The optimum molar ratio of about 0.23 to 0.26 has a solubility rate which is almost three times faster than that of the composition of Patent. No. 2,998,310.

The loose densities of these product mixtures varied from about 54 to 72 pounds per cubic foot.

TABLE IV

| Material | Weight | Mesh | Material | Weight | Mesh | Molar ratio[1] Na$_2$O/B$_2$O$_3$ | Dissolving time (min.)[2] |
|---|---|---|---|---|---|---|---|
| Boric oxide | 70 | −30+200 | Borax 5 mol (F) | 30 | −100+270 | | (3) |
| Do | 50 | −30+200 | do | 50 | −100+270 | 0.19 | 4.15 |
| Do | 50 | −30+200 | do | 50 | −100+270 | | 3.10 |
| Do | 40 | −30+200 | do | 60 | −100+270 | 0.23 | 2.53 |
| Do | 40 | −30+200 | do | 60 | −100+270 | 0.23 | 1.93 |
| Do | 36.7 | −30+200 | do | 63.3 | −100+270 | 0.24 | 2.63 |
| Do | 36.7 | −30+200 | do | 63.3 | −100+270 | 0.26 | 2.46 |
| Do | 36.3 | −30+200 | do | 63.7 | −100+270 | 0.25 | 2.56 |
| Do | 33.7 | +100 | do | 66.3 | +40 | 0.26 | 4.5 |
| Do | 33.7 | +100 | do | 66.3 | 70/100 | 0.26 | 2.70 |
| Do | 33.7 | −30+200 | do | 66.3 | −100+270 | 0.26 | 2.80 |
| Do | 33.7 | +40 | do | 66.3 | 70/100 | 0.259 | 2.33 |
| Do | 33.7 | +100 | do | 66.3 | −40+200 | 0.26 | 2.83 |
| Do | 33.7 | +40 | do | 66.3 | 40/200 | 0.263 | 2.83 |
| Do | 33.7 | −30+200 | do | 66.3 | −100+270 | 0.26 | 2.80 |
| Do | 33.7 | −30+200 | do | 66.3 | 200/270 | 0.26 | 2.10 |
| Do | 33.7 | −270 | do | 66.3 | −200 | 0.25 | 2.58 |
| Do | 30 | −30+200 | do | 70 | −100+270 | 0.28 | 2.43 |
| Do | 20 | −30+200 | do | 80 | −100+270 | 0.34 | 10.00 |
| Do | 10 | −30+200 | do | 90 | −100+270 | | (3) |
| Composition Pat. No. 2,998,310 | 100 | −100 | | | | 0.25 | 7.06 |
| Boric oxide | 33.7 | C[4] | Borax 5 mol | 66.3 | C[4] | 0.26 | [5,6] 4.8 |
| Do | 23.7 | C[4] | do | 76.6 | C[4] | 0.32 | 6.3 |
| Do | 61.2 | F[4] | do | 38.8 | F[4] | 0.14 | (7, 5) |
| Do | 46.4 | F[4] | do | 53.6 | F[4] | 0.20 | [5] 2.8 |
| Do | 33.7 | F[4] | do | 66.3 | F[4] | 0.26 | [5] 3.5 |
| Do | 23.4 | F[4] | do | 76.6 | F[4] | 0.32 | [5] 7.3 |
| Do | 61.2 | F[4] | do | 38.8 | C[4] | 0.14 | (6) |
| Do | 46.4 | F[4] | do | 53.6 | C[4] | 0.20 | 2.2 |
| Do | 33.7 | F[4] | do | 66.3 | C[4] | 0.26 | 2.8 |
| Do | 23.4 | F[4] | do | 76.6 | C[4] | 0.32 | 6.5 |
| Do | 33.7 | F[4] | do | 66.3 | C[4] | 0.26 | 4.2 |
| Do | 23.4 | F[4] | do | 76.3 | C[4] | 0.32 | 5.5 |
| Do | 68.6 | F[4] | Anhydrous borax | 31.4 | F[4] | 0.14 | (7) |
| Do | 54.7 | F[4] | do | 45.3 | F[4] | 0.20 | 2.5 |
| Do | 41.4 | F[4] | do | 58.6 | F[4] | 0.26 | 4.5 |
| Do | 29.8 | F[4] | do | 70.2 | F[4] | 0.32 | 7.7 |
| Do | 41.4 | F[4] | do | 58.6 | F[4] | 0.26 | 5.3 |
| Do | 29.8 | F[4] | do | 70.6 | F[4] | 0.32 | 4.4 |

[1] Based on analysis of final solution.
[2] Solution of 100 grams solids in 200 grams water at 150° F.
[3] Insoluble.
[4] See coarse C and fine F particles distribution of Table I.
[5] Laboratory tests predicted slight tendency toward caking. No caking was observed in actual samples, however.
[6] Dissolving time determined by the same procedure as used in Table III for all product mixtures following this example.
[7] Incomplete solubility.

As shown in Table IV, only a few product mixtures indicated any tendency toward caking. This indication was only in the laboratory and was extrapolated from the results observed with special porcelain jars having spring loaded lids to give a 4 to 6 pound per square inch pressure when the lid was closed. The actual mixtures of the materials stored in the polyethylene lined bags exhibited no caking after periods of at least three months storage. From observations of the product it was generally concluded that it was non-caking within the Na$_2$O/B$_2$O$_3$ molar ratio range of 0.16 to 0.32.

As further shown in Table IV, the grain size appears to have some effect on the solubility rate. Primarily large grain size mixtures (larger than about 200 mesh) appear to have a somewhat higher solubility rate than the smaller grain size mixtures. Also with the boric oxide and anhydrous borax mixture the tendency to caking as determined from laboratory tests is reduced by the use of a coarse particle size mixed with a fine particle size.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A highly water soluble borate product consisting essentially of particulated boric oxide and a borax compound selected from the group consisting of anhydrous borax and sodium tetraborate pentahydrate, said boric oxide and borax compound being present in sufficient amounts to provide a Na$_2$O/B$_2$O$_3$ molar ratio of from about 0.16 to 0.32 and said product having a bulk density of greater than about 50 pounds per cubic foot.

2. A borate product as defined in claim 1 wherein the molar ratio of Na$_2$O/B$_2$O$_3$ is from 0.23 to 0.26.

3. A borate product as defined in claim 1 wherein said particle size is from 40 to 200 mesh.

4. A borate product as defined in claim 1 wherein the ratio of Na$_2$O/B$_2$O$_3$ is about 0.25 and said density is greater than 60 pounds per cubic foot, said composition having a high solubility rate in water.

5. A highly water soluble, borate product comprising boric oxide and sodium tetraborate pentahydrate having a molar ratio of Na$_2$O/B$_2$O$_3$ of from about 0.16 to 0.32 and a density of greater than about 60 pounds per cubic foot.

6. A product as defined in claim 5 wherein said molar ratio is from 0.23 to 0.26.

7. A product as defined in claim 5 wherein the particle size of said boric oxide differs from the particle size of said sodium tetraborate pentahydrate.

8. A product as defined in claim 7 wherein said boric oxide has a larger particle size than said sodium tetraborate pentahydrate.

9. A product as defined in claim 8 wherein the boron content is at least 20% by weight.

10. A prepackaged boron product for use as a boron providing material when mixed with water comprising boric oxide and sodium tetraborate pentahydrate in sufficient amounts to provide a $Na_2O/B_2O_3$ molar ratio of from 0.23 to 0.26 and a bulk density of about 60 pounds per cubic foot.

References Cited

UNITED STATES PATENTS

| 1,414,609 | 5/1922 | Wheeler | 252—8.1X |
|---|---|---|---|
| 1,501,911 | 7/1924 | Mathias | 252—8.1 |
| 2,272,577 | 2/1942 | Penn | 252—8.1X |
| 2,700,604 | 3/1949 | Knight | 252—1X |

FOREIGN PATENTS

| 806,642 | 12/1958 | Great Britain | 252—2 |
|---|---|---|---|
| 812,146 | 4/1959 | Great Britain | 252—2 |
| 1,063,207 | 3/1967 | Great Britain | 252—2 |

OTHER REFERENCES

Ware, Robert F. et al.: Fire Restant and Fire Retardant Compositions—A Patent Survey; National Paint Varish and Lacquer Association, Inc., Washington, D.C., 1948, pp. 17–19 and 26–28.

HAROLD ANSHER, Primary Examiner

D. J. FRITSCH, Assistant Examiner

U.S. Cl. X.R.

71—128; 117—138; 252—2